(12) United States Patent
Madlener et al.

(10) Patent No.: US 10,509,423 B2
(45) Date of Patent: Dec. 17, 2019

(54) OPTIMIZED PRESSURE REGULATION FOR AND WITH A VACUUM VALVE

(71) Applicant: VAT Holding AG, Haag (CH)

(72) Inventors: Wolfgang Madlener, Buchs (CH); Leo Marugg, Sennwald (CH); Harald Sonderegger, Batschuns (AT)

(73) Assignee: VAT HOLDING AG, Haag (CH)

( * ) Notice: Subject to any disclaimer, the term of this patent is extended or adjusted under 35 U.S.C. 154(b) by 132 days.

(21) Appl. No.: 15/914,410

(22) Filed: Mar. 7, 2018

(65) Prior Publication Data

US 2018/0259983 A1 Sep. 13, 2018

(30) Foreign Application Priority Data

Mar. 7, 2017 (EP) ..................................... 17159728

(51) Int. Cl.
*F16K 31/02* (2006.01)
*G05D 16/20* (2006.01)
(Continued)

(52) U.S. Cl.
CPC ............. *G05D 16/202* (2013.01); *F16K 3/02* (2013.01); *F16K 3/10* (2013.01); *F16K 3/30* (2013.01);
(Continued)

(58) Field of Classification Search
CPC ............. G05D 16/202; G05D 16/2013; G05D 16/024; F16K 37/0041; F16K 37/005;
(Continued)

(56) References Cited

U.S. PATENT DOCUMENTS

| 3,145,969 A | 8/1964 | Von Zweck |
| 5,577,707 A | 11/1996 | Brida |
| (Continued) | | |

FOREIGN PATENT DOCUMENTS

| DE | 1264191 B1 | 3/1968 |
| DE | 7731993 U1 | 1/1978 |
| (Continued) | | |

OTHER PUBLICATIONS

EP 17 15 9728 European Search Report, dated Sep. 11, 2017, pp. 1-5.

*Primary Examiner* — Minh Q Le

(74) *Attorney, Agent, or Firm* — Muncy, Geissler, Olds & Lowe, P.C.

(57) ABSTRACT

A valve system having a vacuum valve with a valve seat having a valve opening defining an opening axis and a first sealing surface around the valve opening, a valve closure having a second sealing surface and a drive unit coupled to the valve closure. A control and regulating unit preforming a pre-regulating step and a regulating step for the valve closure in a regulating cycle, the pre-regulating step moves the valve closure to a defined position and the regulating step the closure position is varied based on a determined control variable and a target value. The regulating and control unit updates at least during a part of the regulating cycle and a regulating profile is derived, the regulating profile is compared with a reference regulating profile and a regulating deviation is derived, an adapted pre-regulating position is provided as the actual pre-regulating position for the regulating cycle.

15 Claims, 4 Drawing Sheets

(51) Int. Cl.
*F16K 51/02* (2006.01)
*G05D 16/00* (2006.01)
*F16K 3/10* (2006.01)
*F16K 3/02* (2006.01)
*F16K 3/32* (2006.01)
*F16K 31/12* (2006.01)
*F16K 37/00* (2006.01)
*F16K 31/04* (2006.01)
*F16K 3/30* (2006.01)

(52) U.S. Cl.
CPC ............... *F16K 3/32* (2013.01); *F16K 31/04* (2013.01); *F16K 31/12* (2013.01); *F16K 37/005* (2013.01); *F16K 37/0041* (2013.01); *F16K 51/02* (2013.01); *G05D 16/024* (2019.01); *G05D 16/2013* (2013.01)

(58) Field of Classification Search
CPC ... F16K 51/02; F16K 3/10; F16K 3/02; F16K 3/32; F16K 3/30; F16K 31/04; F16K 31/12
USPC ....... 137/487.5, 14; 251/326, 158, 205, 212, 251/159, 203; 156/345.26, 345.15
See application file for complete search history.

(56) References Cited

U.S. PATENT DOCUMENTS

| | | | | |
|---|---|---|---|---|
| 5,873,562 A * | 2/1999 | Marugg | ............... | F16K 3/06 138/46 |
| 6,022,483 A * | 2/2000 | Aral | ............... | B01J 3/006 156/345.26 |
| 6,056,266 A | 5/2000 | Blecha | | |
| 6,089,537 A | 7/2000 | Olmsted | | |
| 6,328,051 B1 * | 12/2001 | Maher | ............... | F16K 3/06 137/1 |
| 6,409,149 B1 * | 6/2002 | Maher, Jr. | ............... | F16K 3/06 251/187 |
| 6,416,037 B1 | 7/2002 | Geiser | | |
| 6,629,682 B2 | 10/2003 | Duelli | | |
| 6,776,394 B2 * | 8/2004 | Lucas | ............... | F16K 51/02 251/203 |
| 6,932,111 B2 * | 8/2005 | Ishigaki | ............... | F16K 3/06 137/613 |
| 7,270,311 B1 * | 9/2007 | Brenes | ............... | F16K 3/06 251/175 |
| 7,396,001 B2 * | 7/2008 | Geiser | ............... | F16K 51/02 251/193 |
| 7,762,526 B2 * | 7/2010 | Coleman | ............... | F16K 3/10 251/187 |
| 7,802,772 B2 * | 9/2010 | Geiser | ............... | F16K 51/02 251/175 |
| 8,550,430 B2 * | 10/2013 | Lamprecht | ............... | F16K 51/02 251/175 |
| 8,833,388 B2 * | 9/2014 | Eto | ............... | H01L 21/67253 137/487.5 |
| 10,007,273 B2 * | 6/2018 | Martino | ............... | E21B 34/02 |
| 2005/0062007 A1 * | 3/2005 | Fischer | ............... | F16K 3/029 251/212 |
| 2005/0067603 A1 | 3/2005 | Lucas et al. | | |
| 2005/0182524 A1 | 8/2005 | Brodeur et al. | | |
| 2008/0017820 A1 | 1/2008 | Ehrne | | |
| 2009/0084997 A1 * | 4/2009 | Lee | ............... | F16K 3/06 251/129.01 |
| 2010/0116349 A1 | 5/2010 | Fischer | | |
| 2010/0327203 A1 * | 12/2010 | Nagai | ............... | F16K 3/06 251/193 |
| 2012/0273706 A1 * | 11/2012 | Kusunoki | ............... | G05D 16/2013 251/129.15 |
| 2013/0153045 A1 * | 6/2013 | Vestyck | ............... | H01L 21/67253 137/14 |
| 2014/0130907 A1 * | 5/2014 | Watanabe | ............... | G05D 16/2086 137/487.5 |
| 2014/0183391 A1 * | 7/2014 | Blecha | ............... | F16K 3/16 251/158 |
| 2014/0290752 A1 * | 10/2014 | Matsuura | ............... | H01L 21/67017 137/14 |
| 2015/0129055 A1 * | 5/2015 | Byler | ............... | A61M 1/14 137/487.5 |
| 2016/0195191 A1 * | 7/2016 | Taguchi | ............... | F16K 51/02 251/318 |
| 2018/0195624 A1 * | 7/2018 | Taguchi | ............... | F16K 51/02 |
| 2018/0196449 A1 * | 7/2018 | Hirata | ............... | G05D 16/024 |
| 2019/0056035 A1 * | 2/2019 | Bohm | ............... | F16K 51/02 |

FOREIGN PATENT DOCUMENTS

| | | |
|---|---|---|
| DE | 3447008 C2 | 6/1986 |
| JP | 2015190496 A | 11/2015 |

* cited by examiner

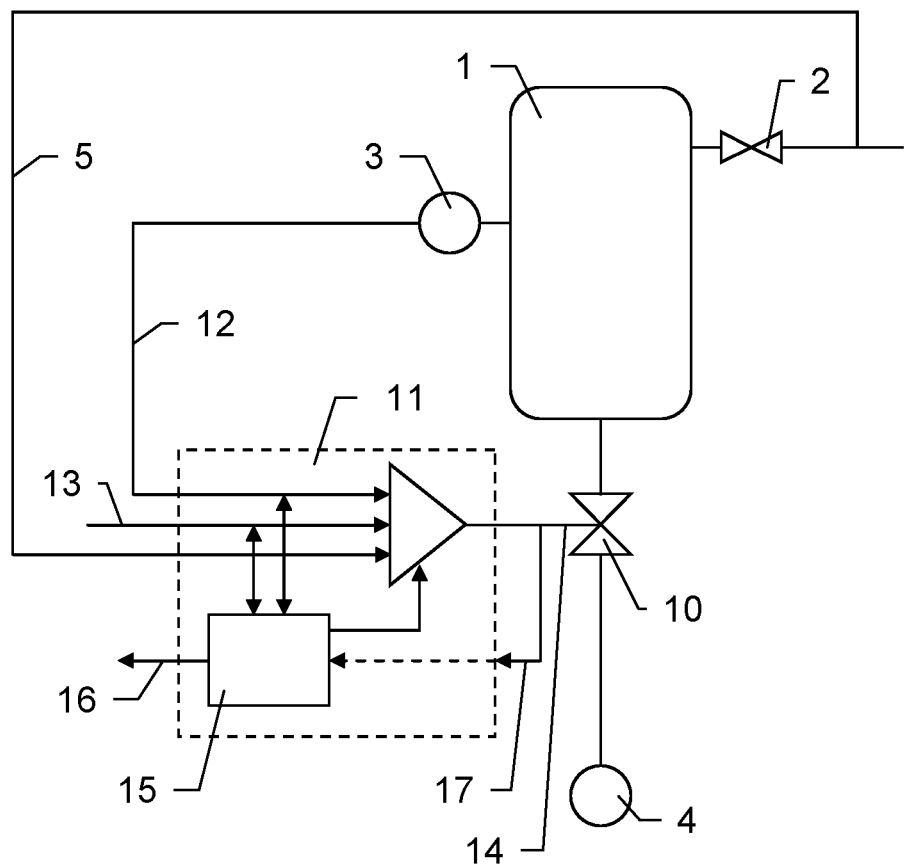
Fig. 1
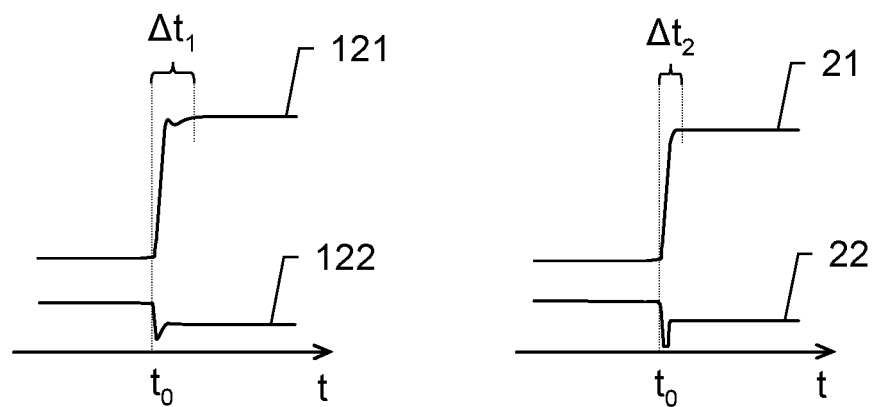
Fig. 2a  Fig. 2b

OPTIMIZED PRESSURE REGULATION FOR AND WITH A VACUUM VALVE

CROSS REFERENCE TO RELATED APPLICATIONS

This application claims priority to European Patent Application No. 17159728.9, which was filed in the European Patent Office on Mar. 7, 2017, and which is herein incorporated by reference in its entirety.

BACKGROUND

The invention relates to a system comprising a vacuum regulating valve and a control and regulating unit for pressure-regulated operation of a processing process under vacuum conditions.

In general, vacuum valves for regulating a volume or mass flow and for substantially gas-tight closure of a flow path, which leads through an opening formed in a valve housing are known in various embodiments from the prior art and are used in particular in vacuum chamber systems in the area of IC, semiconductor or substrate fabrication which must take place in a protected atmosphere as far as possible without the presence of contaminating particles. Such vacuum chamber systems comprise in particular at least one evacuatable vacuum chamber for receiving semiconductor elements or substrates to be processed or fabricated, which has at least one vacuum chamber opening, through which the semiconductor elements or other substrates can be guided into and out of the vacuum chamber as well as at least one vacuum pump for evacuating the vacuum chamber. For example, in a production plant for semiconductor wafers or liquid crystal substrates, highly sensitive semiconductor or liquid crystal elements run sequentially through a plurality of process vacuum chambers in which the parts located inside the process vacuum chambers are processed by means of a processing device in each case. Both during the processing process inside the process vacuum chambers and also during transport from chamber to chamber the highly sensitive semiconductor elements or substrates must always be located in a protected atmosphere—in particular in an air-free environment.

On the one hand, peripheral valves for opening and closing a gas supply or discharge and on the other hand, transfer valves for opening and closing the transfer openings of the vacuum chambers are used for this purpose for introducing and removing the parts.

The vacuum valves through which semiconductor parts pass are also designated as vacuum transfer valves as a result of the described area of application and the associated dimensioning, as rectangular valves as a result of their mostly rectangular opening cross-section and as slide valves, rectangular sliders or transfer slide valves as a result of their usual mode of operation.

Peripheral valves are used in particular for controlling or regulating the gas flow between a vacuum chamber and a vacuum pump or another vacuum chamber. Peripheral valves are located for example inside a pipe system between a process vacuum chamber or a transfer chamber and a vacuum pump, the atmosphere or another process vacuum chamber. The opening cross-section of such valves, also known as pump valves, is usually smaller than in the case of a vacuum transfer valve. Since peripheral valves are used, depending on the area of application, not only for complete opening and closing of an opening but also for controlling or regulating a flow through continuous adjustment of the opening cross-section between a complete open position and a gas-tight closed position, they are also designated as regulating valves. A possible peripheral valve for controlling or regulating the gas flow is the pendulum valve.

In a typical pendulum valve such as is known for example from U.S. Pat. No. 6,089,537 (Olmsted), in a first step a usually round valve disk is pivoted rotatably over an opening which is also usually round from a position which exposes the opening into an intermediate position which covers the opening. In the case of a slide valve such as is described in U.S. Pat. No. 6,416,037 (Geiser) or U.S. Pat. No. 6,056,266 (Blecha), the valve disk and also the opening is usually configured to be rectangular and in this first step is pushed linearly from a position which exposes the opening into an intermediate position which covers the opening. In this intermediate position, the valve disk of the pendulum valve or slide valve is located in a spaced-apart opposite position to the valve seat surrounding the opening. In a second step, the distance between the valve disk and the valve seat is reduced so that the valve disk and the valve seat are pressed uniformly onto one another and the opening is closed in a substantially gastight manner. This second movement preferably takes place substantially in a perpendicular position to the valve seat. The sealing can be accomplished, for example, either via a sealing ring arranged on the closure side of the valve disk which is pressed onto the valve seating which runs around the opening or via a sealing ring on the valve seat against which the closure side of the valve disk is pressed. As a result of the closure process which takes place in two steps, the sealing ring is barely subjected to shear forces which would destroy the sealing ring between the valve disk and the valve seat since the movement of the valve disk in the second step takes place substantially rectilinearly perpendicularly onto the valve seat.

Different sealing processes are known from the prior art, for example, from U.S. Pat. No. 6,629,682 B2 (Duelli). A suitable material for sealing rings and seals in vacuum valves is, for example, fluororubber, also known as FKM, in particular the fluoroelastomer known under the trade name "Viton" as well as perfluororubber, FFKM for short.

Various drive systems for achieving this combination of a rotational movement of the valve disk in the case of a pendulum valve and translational movement of the valve disk in the case of the slide valve parallel over the opening and a substantially translational movement perpendicular to the opening are known, for example, from U.S. Pat. No. 6,089,537 (Olmstead) for a pendulum valve and from U.S. Pat. No. 6,416,037 (Geiser) for a slide valve.

The pressing of the valve disk onto the valve seat must be accomplished in such a manner that both the required gas-tightness is ensured within the entire pressure range and also any damage to the sealing medium, in particular the sealing ring in the form of an O ring, due to excessive pressure loading is avoided. In order to avoid this, known valves provide a contact pressure regulation of the valve disk regulated depending on the pressure difference prevailing between the two valve disk sides.

Particularly in the case of large pressure fluctuations or when changing from negative pressure to positive pressure or conversely, however a uniform force distribution along the entire circumference of the sealing ring cannot always be ensured. In general, it is strived to decouple the sealing ring from supporting forces which arise from the pressure applied to the valve. In U.S. Pat. No. 6,629,682 (Duelli), for this purpose, for example a vacuum valve with a sealing medium is proposed which is composed of a sealing ring and an adjacently located support ring, so that the sealing ring is substantially freed from support forces.

In order to achieve the required gas tightness, optionally both for positive and also negative pressure, in addition to or alternatively to the second movement step some known pendulum valves or slide valves provide a valve ring surrounding the opening which is displaceable perpendicular to the valve disk which is pressed onto the valve disk for gas-tight closing of the valve. Such valves with valve rings which are actively displaceable relative to the valve disk are known, for example from DE 1 264 191 B1, DE 34 47 008 C2, U.S. Pat. No. 3,145,969 (von Zweck) and DE 77 31 993 U. U.S. Pat. No. 5,577,707 (Brida) describes a pendulum valve with a valve casing having an opening and a valve disk which is pivotable parallel over the opening for controlling a flow through the opening. A valve ring which encloses the opening is actively movable perpendicularly in the direction of the valve disk by means of a plurality of springs and compressed air cylinders. A possible further development of this pendulum valve is proposed in US 2005/0067603 A1 (Lucas et al.).

Since aforesaid valves are used inter alia in the fabrication of highly sensitive semiconductor elements, the particle generation caused in particular by actuation of the valve and by the mechanical loading of the valve closure member and the number of free particles in the valve chamber should be kept as small as possible. The particle generation is primarily a consequence of friction, for example due to metal-metal contact and due to abrasion.

As described above, vacuum regulating valves are used for adjusting a defined process environment in a process chamber. The regulation is typically accomplished here by means of a pressure signal which provides information relating to the chamber internal pressure and by means of a target value, i.e. a desired pressure which should be achieved by means of the regulation. The position of a valve closure (valve disk) is then varied in the course of the regulation so that the desired pressure is achieved within a certain time interval.

Alternatively to the regulation, vacuum regulating valves can also be operated in a controlled manner by means of known process parameters such as, for example a desired pressure to be achieved in the process chamber in a predefined time. For this purpose, for example relevant desired positions for the valve disk are provided and this position is approached in likewise predefined times.

Both the above methods have their specific advantages and disadvantages. Thus, a desired pressure in the process chamber can be set in a relatively short time by means of a predefined control but as a result of a typically lacking feedback (e.g. current pressure information), a prediction on the currently prevailing pressure can only be made with reservations. Any undesired influences on the production process such as, for example a changed gas inlet or a leak of the process chamber remain completely unidentified and then typically result in a reduction in the fabrication quality.

In contrast to control, a regulation of the pressure in a process chamber is more time-intensive. A feedback signal—typically produced by a pressure sensor which measures the actually applied chamber pressure—is recorded and processed with a natural delay. A regulation based thereon is consequently made with a corresponding delay and results in a correspondingly later setting of the desired pressure. On the other hand, the regulation of the desired pressure may reliably set this even with varying gas inlets or pressure fluctuations in the process chamber. As a result of the more reliable process safety in view of the definitive chamber internal pressure, in most cases a regulation of the valve is preferably used.

It is therefore the object of the invention to provide an improved vacuum valve with a regulation which is able to avoid the aforesaid disadvantages.

In particular, it is the object of the invention to provide an improved vacuum valve with a regulation which exhibits an improved, i.e. more rapid and more reliable regulating behaviour.

These objects are solved by implementing the characterizing features of the independent claims. Features which further develop the invention in alternative or advantageous manner can be deduced from the dependent patent claims.

SUMMARY

The basic idea of the present invention is to divide an executed regulating process into two partial steps in order to achieve an acceleration for the closure positioning which determines the chamber pressure. In a first partial step the valve closure is moved in a controlled manner into a predetermined pre-regulating position and in a second partial step a regulation of the chamber pressure is then accomplished. Furthermore, the in particular multiply executed regulating cycles are monitored and recorded in each case in order to compare with a corresponding reference. Based on this comparison an adaptation of the pre-regulating position can then be made for following cycles.

As a result, on the one hand the desired pressure can be achieved more rapidly and secondly an autonomous and self-adapting regulating system can be provided.

In order to temporally optimize the adjustment of a new working point (e.g. new desired pressure in the process chamber), the transition phase from one working point to another is controlled by a suitable positioning sequence instead of regulating. The positioning sequence (pre-regulating step) brings the pressure time-optimally into the vicinity of the new working point. After the positioning sequence, a switchover into a closed loop mode takes place in order to then precisely adjust and maintain the pressure.

The timing for the pre-regulating step and the pre-regulating position used are obtained, for example, from a reference cycle or several reference cycles which are regulating in the closed loop mode.

The positioning sequence parameters, in particular the pre-regulating position or a pre-regulating time can be optimized after each regulating cycle for the next cycle.

Preferably the positioning sequence is synchronized with a flow controller control, i.e. the pre-regulating stop or the positioning sequence starts with a determined activation of a flow controller.

For the pre-positioning, for example, the following parameters are required:

adjusted closure position for a new pressure (corresponds, for example, to the pre-regulating position), current position of the valve closure and a criterion according to which a change is to be made from the current position into the adjusted position.

The current position of the valve closure is used in particular in a preceding cycle. For the following cycle the position is determined for example at the end of the preceding cycle or a position average (over, for example, 100 ms) is formed.

The last average which was determined before the next set point (working point) is then stored. It would also be feasible that a position which is achieved after a certain time in the regulating mode is stored. As a result influences due to flux variations or due to plasma ignition in the chamber can be eliminated within the current step.

The pre-regulating position is selected, for example, so that the chamber internal pressure approaches the new desired value as rapidly as possible. On the other hand, the approach should not take place too rapidly so that a regulating and control unit is able to efficiently enable the adjustment.

The invention therefore relates to a valve system comprising at least one vacuum valve for regulating a volume or mass flow and for gas-tight sealing of a process volume and a regulating and control unit. The vacuum valve comprises a valve seat which has a valve opening defining an opening axis and a first sealing surface running around the valve opening, and has a valve closure for substantially gas-tight closure of the valve opening having a second sealing surface corresponding to the first sealing surface.

In addition, a drive unit coupled to the valve closure is provided which is configured in such a manner that the valve closure is variable and adjustable in a defined manner to provide respective closure positions and be adjustable from an open position in which the valve closure at least partially exposes the valve opening into a closed position in which the first sealing surface is pressed onto the second sealing surface and closes the valve opening in a substantially gas-tight manner, and back.

The regulating and control unit is configured for execution of a regulating cycle with a pre-regulating step and a subsequent regulating step for the valve closure. Such a regulating cycle can in particular be executed multiply repeatedly wherein other process steps or cycles can be executed between two such cycles.

When executing the regulating cycle, in the course of the pre-regulating step the valve closure is moved by corresponding activation of the drive unit, in particular from the open position into a defined current pre-regulating position controlled by the regulating and control unit. In the pre-regulating step therefore, no true regulation of a valve position takes place but the valve closure is specifically brought by means of control into a specific state—into the current pre-regulating position. The predefined pre-regulating is variable in principle from cycle to cycle and a corresponding adjustment of the closure position is made in each case by means of the currently defined pre-regulating position.

In the course of the regulating step a specific variation or adjustment of the closure position is executed depending on the current pre-regulating position by activating the drive unit based on a currently determined control variable for a process parameter and on a target value. In particular, the control variable can be brought close to the target value. An effect brought about by a defined position change of the valve closure on the control variable can be predicted at least partially. In this following step, a true regulated (closed-loop) adjustment of the closure position now takes place.

For example, in response to a measured pressure in a process chamber, an opening cross-section of the valve is adjusted in a specific direction wherein a pressure drop is to be expected with an increase in the cross-section and a pressure rise is to be expected in the case of a decrease in the cross-section (predictability). If the process structure is very well known, in addition to the direction (increase and decrease of the pressure) of the pressure variation, a magnitude of the pressure variation brought about hereby can be at least roughly known.

As a result of the two-stage nature of the adjustment cycle, the regulation is initiated for example with a certain time offset (produced by the controlled adjustment of the valve closure which takes place previously), with the result that current pressure data from the process volume are then already available and the regulation can thus start directly.

According to the invention, the regulating and control unit has an updating functionality which is configured in such a manner that during its execution the control variable is recorded at least during a part of the regulating cycle and based thereon an actual regulating profile is derived. The actual regulating profile is compared with a reference regulating profile and a regulating deviation is derived. A difference and in particular an extent of the difference is determined.

An adaptation of the current pre-regulating position is made depending on a manifestation of the derived regulating deviation and based on the at least partially predictable effect on the control variable. In other words, this means that in the case of a determined deviation which for example exceeds a specific threshold value, an adaptation of the pre-regulating position can be made so that the deviation is counteracted hereby.

The adapted pre-regulating position is provided and/or stored as the current pre-regulating position for the regulating cycle. The current pre-regulating position is therefore accordingly re-set and consequently set as the current pre-regulating in the pre-regulating step in a next regulating cycle. A previously occurring deviation in the regulating cycles can thus be reduced or completely avoided in a next cycle.

The regulating and control unit is additionally configured in such a manner that the updating functionality can be executed continuously, in particular over a plurality of regulating cycles during a production process with the process volume.

In one embodiment, the updating functionality is configured in such a manner that the reference regulating profile is produced and stored by recording the control variable during execution of a first regulating cycle or a first regulating step and the actual regulating profile is derived by recording the control variable during execution of a second regulating cycle or a second regulating step.

In particular, the second regulating cycle or the second regulating step is executed following the first regulating cycle or the first regulating step.

The reference regulating profile is, for example, a regulating profile recorded in a single previous cycle. Alternatively, the reference regulating profile can be based on a plurality of previously executed cycles or be generated by means of a specific learning process.

In other words, in one embodiment the regulating and control unit can be configured in such a manner that the reference regulating profile is produced and stored by recording the control variable during execution of a plurality of regulating cycles or a plurality of regulating steps, in particular wherein an averaging of the control variables recorded for a specific time interval or for a specific time point of the regulating step is accomplished.

The regulating and control unit can furthermore have a learning functionality for generating the reference regulating profile. The learning functionality is configured in such a manner that during its execution for carrying out a number of substantially identical regulating cycles corresponding to a desired operation for the regulating cycle, respective desired positions for the valve closure are recorded over at least one time section of a respective regulating cycle and the recorded desired positions for the valve closure are stored with reference to the respective time sections of the regulating cycle as the reference regulating profile.

The reference regulating profile can be defined depending on the target value and a reliable time for executing the regulating cycle or the pre-regulating step or the regulating step, in particular the process step to be executed.

According to one embodiment of the invention, the regulating and control unit is configured in such a manner that the current pre-regulating position is adapted in such a manner that an effect on the control variable or the process parameter which counteracts in a defined manner the regulating deviation in terms of direction and/or in terms of magnitude is produced with the adapted pre-regulating position. The pre-regulating position can thus be adjusted so that, for example, a too-low chamber pressure is pre-compensated by means of a reduced valve opening.

The process parameter which is recorded by the control variable can for example be pressure information for the process volume, wherein the target value can be a desired pressure to be reached in the process volume and the currently determined control variable represents a current pressure in the process volume. This then involves a pressure regulation for a process volume.

In one variant of the invention the target value can be a desired pressure to be reached in the process volume, wherein the currently determined control variable—for example in addition to pressure information—specifies a current medium inflow into the process volume, in particular wherein the currently determined control variable takes into account a current pressure inlet size. With this additional information the desired pressure can be regulated with increased accuracy and efficiency.

In particular, outlet information can be stored or currently determined with the current determined control variable, wherein the outlet information specifies which mass or which volume of a medium (e.g. process gas) flows per unit time from the process volume and depending on the closure position. The outlet information can in this case depend crucially on an extraction capacity provided by a vacuum pump.

In order to execute the regulating cycle, according to one embodiment a trigger or start signal is received. The pre-regulating step can therefore be initiated or executed depending on a receipt of a starting signal. The regulating cycle or the pre-regulating step are executed as soon as the start signal is received and processed by the regulating and control unit.

Preferably the start signal is generated by a superordinate process controller, wherein the process controller is configured to control a production process with the process volume for a multiplicity of products of the same type, the regulating cycle represents a part of the production process which accordingly recurs multiple times and the start signal is accordingly output multiple times in the course of the production process.

The process controller can in this context also provide a synchronization of start signal output and for example a supply or supply change of a process gas. As a result, the regulating process can be initiated matched with a specific process step and the controlled adjustment into the pre-regulating position takes place with the beginning of the respective process step, e.g. together with an introduction of a process gas.

The regulating and control unit can, for example, be connected to a pressure sensor wherein an output signal of the pressure sensor provides the currently determined control variable (current pressure in the process chamber). Alternatively or addition, the regulating and control unit can be connected to a mass flow meter or a mass flow monitoring unit and an output signal of the mass flow meter or the mass flow monitoring unit provides the currently determined control variable (e.g. as information relating to an amount of inflow of a process gas per time). In the second case, therefore the control variable need not be the chamber pressure but can also represent the current gas inflow.

Preferably the actual regulating profile and the reference regulating profile are recorded in the form of a reference regulating curve.

In one embodiment, the vacuum valve and the regulating and control unit are executed in integrated design.

Alternatively the regulating and control unit can be configured structurally separately from the vacuum valve and be in communication with the vacuum valve, wherein a wireless radio connection or a wired connection exists.

In a further functionality, the regulating and control unit can be configured in such a manner that process information can be generated depending on the comparison of the actual regulating profile with the reference regulating profile.

The process information can be generated depending on the manifestation of the derived regulating deviation, in particular wherein the process information is generated if the regulating deviation exceeds a predefined threshold value.

The process information can furthermore comprise an output signal, wherein the output signal is generated acoustically or visually. In addition, the process information can comprise quality information giving a quality for the regulating cycle and by means of this quality information, a user output, in particular error information or an alarm signal can be generated.

Based on the process information, an undesired process state can be additionally identified, in particular an undesired mass inflow during the regulating cycle, in particular wherein the existence of a leak of the process volume can be identified.

The invention additionally relates to a regulating and control unit for a vacuum valve, wherein the vacuum valve is configured for regulating a volume or mass flow and/or for gas-tight sealing of a process volume and has an adjustable valve closure.

According to the invention, the regulating and control unit is configured for, in particular multiple, execution of a regulating cycle with a pre-regulating step and a following regulating step for the valve closure. When executing the regulating cycle, in the course of the pre-regulating step the valve closure is moved by corresponding activation of a drive unit, in particular from an open position into a defined current pre-regulating position controlled by the regulating and control unit. In the course of the regulating step a specific variation or adjustment of the closure position is executed depending on the current pre-regulating position by activating the drive unit based on a currently determined control variable for a process parameter and on a target value, in particular whereby the control variable can be brought close to the target value. An effect brought about by a defined position change of the valve closure on the control variable can be predicted at least partially.

The regulating and control unit has an updating functionality which is configured in such a manner that during its execution the control variable is recorded at least during a part of the regulating cycle and based thereon an actual regulating profile is derived. The actual regulating profile is compared with a reference regulating profile and a regulating deviation is derived. The derivation of the regulating deviation also comprises randomly establishing that no deviation exists.

An adaptation of the current pre-regulating position is made depending on a manifestation of the derived regulating deviation and based on the at least partially predictable effect on the control variable and the adapted pre-regulating position is provided and/or stored as the current pre-regulating position for the regulating cycle. It is understood accordingly that in the event that the deviation is zero, the adaptation can also be made in such a manner that the current pre-regulating position is replaced by a substantially identical new pre-regulating position.

The regulating and control unit is configured in such a manner that the updating functionality can be executed continuously, in particular over a plurality of regulating cycles during a production process with the process volume.

The invention further relates to a method for carrying out a production cycle with a vacuum valve, wherein the vacuum valve is configured and arranged for regulating a volume or mass flow, in particular a volume or mass flow from a process volume and for gas-tight sealing of a process volume. The vacuum valve comprises a valve seat which has a valve opening defining an opening axis and a first sealing surface running around the valve opening and additionally has a valve closure for substantially gas-tight closure of the valve opening having a second sealing surface corresponding to the first sealing surface. A drive unit coupled to the valve closure is configured in such a manner that the valve closure is variable and adjustable in a defined manner to provide respective closure positions and can be adjusted from an open position in which the valve closure at least partially exposes the valve opening into a closed position in which the first sealing surface is pressed onto the second sealing surface and closes the valve opening in a substantially gas-tight manner and back.

In the course of the method a regulating cycle for the valve closure is executed, in particular multiple times and the regulating cycle at least comprises a controlled movement of the valve closure and a regulated variation or adjustment of the closure position. The controlled movement of the valve closure is accomplished depending upon receipt of a start signal by targeted activation of the drive unit, in particular from the open position into a defined current pre-regulating position and subsequently the regulated variation or adjustment of the closure position depending on the current pre-regulating position by activating the drive unit based on a currently determined control variable for a process parameter and a target value, in particular whereby the control variable is brought close to the target value. An effect brought about by a defined position change of the valve closure on the control variable is in this case known or can be predicted at least partially.

The control variable is recorded at least during a part of the regulating cycle and based thereon an actual regulating profile is derived. The actual regulating profile is compared with a reference regulating profile and a regulating deviation is derived. An adaptation of the current pre-regulating position is made depending on a manifestation of the derived regulating deviation and based on the at least partially predictable effect on the control variable and the adapted pre-regulating position is provided and/or stored as the current pre-regulating position for the regulating cycle.

The subject matter of the invention is further a computer program product which is stored on a machine-readable carrier, in particular in a storage unit of a valve system described above or in a said regulating and control unit, with program code for executing or controlling at least specific steps of the method of the aforesaid method. The steps are a controlled movement of the valve closure, a regulated variation or adjustment of the closure position, a derivation of an actual regulating profile and comparison with a reference regulating profile, a derivation of a regulating deviation, an adaptation of the pre-regulating position depending on a manifestation of the derived regulating deviation and based on the at least partially predictable effect on the control variable and a provision of the adapted pre-regulating position as the current pre-regulating position for the regulating cycle.

In particular, the program or the program code is executed in an electronic data processing unit, in particular the regulating and control unit of the valve system, or in the regulating and control unit.

An updating of a corresponding regulating cycle can therefore be accomplished by executing a corresponding (computer-implemented) algorithm.

BRIEF DESCRIPTION OF THE DRAWINGS

The apparatus according to the invention and the method according to the invention are described in detail hereinafter merely as an example with reference to specific exemplary embodiments shown schematically in the drawings, wherein further advantages of the invention are also discussed. In detail in the figures:

FIG. 1 shows a schematic diagram of a first embodiment of a vacuum system for the controlled-regulated operation of a process chamber according to the invention;

FIG. 2a-b each show a regulating process at a vacuum valve for setting a new working point;

DETAILED DESCRIPTION

Figure 3A:
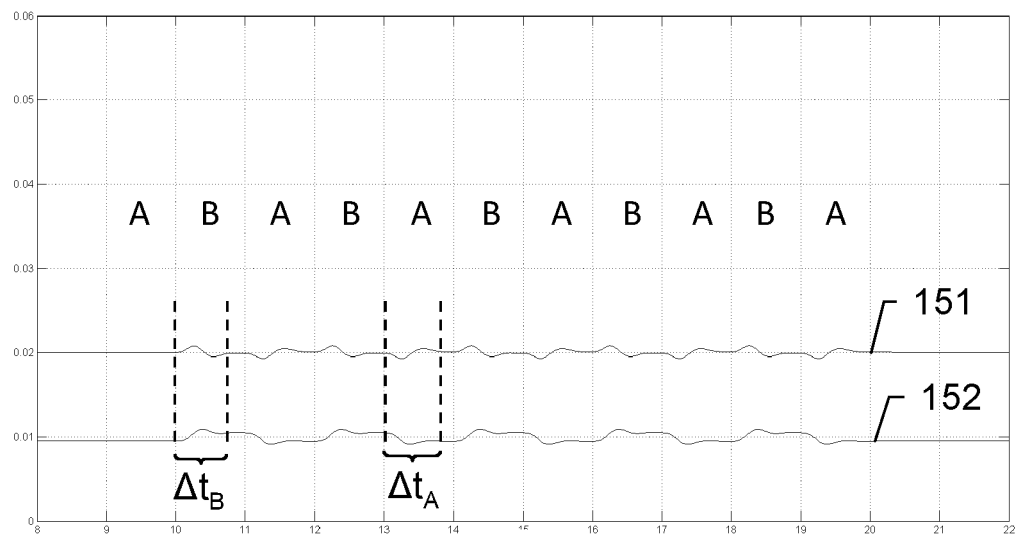
FIG. 3a-b each show a regulating process at a vacuum valve for regulating or maintaining a chamber pressure with variable flow.

FIG. 1 shows schematically a structure of a system for processing an object, e.g. a semiconductor wafer under vacuum conditions. The structure comprises a process chamber 1 and a feed into the process chamber wherein the feed is provided with a gas flowmeter or regulator 2 and therefore a quantity of gas which flows into the process chamber can be measured or the inflowing gas quantity can be regulated accordingly. Furthermore, a pressure sensor 3 is provided which allows the pressure inside the process chamber (chamber pressure) to be determined.

On an outlet side of the process chamber 1 a vacuum pump 4 is connected to the chamber 1 for the evacuation thereof. An adjustable vacuum valve 10 for controlling or regulating the outflowing mass flow is arranged between the vacuum pump 4 and the chamber 1. The (controlled) adjustability can be achieved here, for example by means of a motorized, pneumatic or hydraulic drive of the valve.

The system has according to the invention a regulating and control unit 11 which is connected to the valve 10 and provide both regulated and controlled activation of the valve 10 by means of a corresponding input quantity 12 and a desired quantity 13 or by means of a known pre-regulating position for a valve closure of the vacuum valve 10. The pre-regulating position can be stored, e.g. in the form of an adjusting position in an internal memory of the regulating and control unit 11.

The regulating and control unit 11 provides a control according to the invention for the valve in the form of a regulating cycle. The regulating cycle comprises two successively running stages. In a first stage—a pre-regulating step—the valve closure is placed in this position by means of a previously known intermediate desired position (pre-regulating position). The pre-regulating step is initiated or triggered by a start signal 5. The start signal 5 is typically output by a host controller wherein this controller provides the control of a superordinate production process.

The host controller controls for example an equipping of the process chamber with a workpiece to be processed, e.g. semiconductor wafer and then the creation of a defined atmosphere in the process chamber, For such a process atmosphere typically a defined process gas is fed into the process chamber 10—in particular via the gas flow meter or regulator 2—and by means of the vacuum extraction and its regulation with the valve 10 the internal pressure is brought to a predefined level. The generation and output of the start signal 5 is preferably synchronized with the process control by the host controller. For example, the start signal 5 is output after the equipping and with inlet of the process gas.

For an optimized, i.e. rapid process cycle, the pre-regulating step is firstly accomplished. By this means the valve closure is brought into the pre-regulating position without regulation and only by means of a direct control—here by output of an adjusting signal 14 to the motorized valve 10. For example, a corresponding offset with respect to an open position of the valve closure is stored which can be specifically approached. The advantage of such a pre-regulation or position-based pre-control lies in a significantly faster attainment of a desired extraction capacity with the result that when viewed over the entire regulating cycle, this can be run through with a correspondingly shorter cycle time.

The increase in speed also results from the naturally given signal delays (delay) for a pure regulating system. For example, the pressure sensor 3 requires a certain time before the establishment of a current chamber pressure and for a corresponding signal generation and output. That is, the regulating system also receives the required control variable with this delay, which results in just such a delay for the regulation and attainment of the desired pressure.

By means of the pre-regulation, a first adjustment section for the valve closure can be travelled without a feedback signal (current pressure) and then transferred into a regulating step, i.e. a regulated movement of the valve closure. By this means the above-described delay can be reduced since the signal of the pressure sensor is, for example, already present at the beginning of the subsequent regulating phase and can then be directly processed by the regulator.

A transition from the pre-regulating step into a regulating step which forms the second stage of the regulating cycle takes place on reaching the pre-regulating position. The reaching of the pre-regulating position can be identified, for example, by means of a currently and continuously determined closure position and a comparison of this position with the predefined pre-regulating position. A correspondingly current closure position information 17 can be transferred from the valve 10 or a valve drive to the regulating and control unit 11. In particular, such a transfer of information takes place to a regulating and optimization module 15 of the regulating and control unit 11 (indicated by the dashed extension of the logical arrow 17). As soon as the pre-regulating position is reached, a switchover takes place from the pre-regulating mode (control) into the true regulating mode (regulating step).

Alternatively the switchover can take place between the two steps after a predefined duration for the pre-regulating step which can be derived from the known activation behaviour of the valve. Since the switchover takes place automatically here after the time provided for the pre-regulating step has elapsed, no further feedback signal is required for this.

Starting from the then pre-set pre-regulating position, a current pressure signal 12 of the pressure sensor 3 is obtained in the regulating step continuously as input quantity 12, i.e. as currently determined control variable, with the result that a current pressure state in the process chamber 1 is known or prepared. The regulating and control unit 11 is additionally provided with a desired pressure or a desired pressure profile for a respective processing process as desired or target value 13. By means of these input quantities, an adjusting signal 14 is generated and output to the motorized valve 10 by the regulating and control unit 11.

In order to set a desired internal pressure in the process chamber 1, in the course of the regulating cycle the valve opening of the vacuum valve 10 is therefore varied so that a gas flow takes place from the process chamber so that the current internal pressure can be approximated to a target pressure—in a first step by means of a controlled one-off adjustment of the valve closure into the pre-regulating position and in a second step by means of a regulated variation of the closure position using the continuously recorded control variable. Here in particular an effect brought about by a defined position change of the valve closure on the control variable can be substantially predicted whereby a specific and efficient regulation can be provided.

For example, in a first time section of a processing process, the valve opening should be set relatively wide open so that the internal pressure drops as fast as possible and in the further course of the regulation, the valve opening should be set less wide open so that in a subsequent time step the desired internal pressure can be set and held by a controlled outflow of a smaller quantity of gas per unit time, wherein in particular a laminar or molecular gas flow or however a mixed form of both is present. For both these time sections, i.e. for each desired pressure to be set, a regulating cycle according to the invention with pre-control and subsequent regulation can be stored.

By varying the valve position, i.e. the position of the valve closure relative to the valve opening, the pressure inside the process chamber 1 is varied and therefore for each regulating cycle a regulating profile, in particular a regulating curve is defined, i.e. pressures and/or valve positions for respective time points in a specific time interval. A first partial section of the regulating profile is defined according to the invention as a pre-regulating step in each case. A processing process in a process chamber is typically repeated multiple times in regulating cycles (multiple execution of the regulating profile), wherein the pressure regulation should then be executed in each case in the same way in a corresponding cyclic manner.

According to the invention, the regulating and control unit 11 has an updating functionality. The updating functionality is executed during passage through the regulating cycle or at least during the regulating step. Here the received control variable 12 (e.g. signal of the pressure sensor) is recorded at least intermittently and an actual regulating profile is derived based on this. Therefore, for example a pressure profile and/or—upon receipt of the closure position information 17 as part of the control variable—a closure position profile are derived, i.e. values for the chamber internal pressure and values for the closure position in relation to regulating time points.

In the course of the updating of the regulating cycle by means of the updating functionality, the recorded actual regulating profile is compared with a reference regulating profile and a regulating deviation is derived on this basis. The reference regulating profile can in this case represent a pre-recorded regulating cycle or step optionally executed in a specific manner and under defined and controlled conditions. For example, the reference regulating profile is stored in the form of a desired regulating curve.

An adaptation of the pre-regulating position is then made depending on a manifestation of the derived regulating deviation and based on the substantially predictable effect on the control variable 12. In other words, the pre-regulating position can be re-set in such a manner that within the framework of the calculated deviation the actual regulating profile is approached to the reference profile.

For the adaptation of the pre-regulating position, the likewise recordable closure position information 17 can also be taken into account over the executed regulating step. As a result additional information regarding the valve position is accessible beyond the regulating step and a reference can be made between the derived regulating deviation and the closure position linked to this. As a result, knowing the effect of specific closure positions on the pressure level in the chamber 1, a targeted and efficient adaptation or correction of the regulating reference at specific time points during the regulating is possible.

The regulating and control unit 11 can be configured in such a manner that the updating functionality is executed continuously, in particular over a plurality of regulating cycles during a production process.

The system shown with FIG. 1 therefore enables on the one hand a rapid adjustment of a desired pressure state in the process chamber 1 (as a result of the two-stage nature of the regulating) and furthermore a continuous adaptation of the regulating profile in such a manner that, for example in the event of any deviations from a desired regulating, a correction of the regulating cycle can be made automatically by, for example, re-adjustment of the pre-regulating position or other regulating parameters.

In order to verify the process integrity and/or quality, a checking or monitoring functionality can also be provided. By means of the information relating to the regulating profile of the regulating, a currently recorded regulating profile can be compared with the desired profile and based on this comparison, information can be derived as to whether the regulating has been carried out within set limits, e.g. within a tolerance range or not.

The regulating and control unit 11 can further comprise a learning function by means of which the information relating to a reference regulating can be created. For this purpose a production cycle is executed several times with set desired conditions (e.g. desired pressure, desired temperature, pressure profile, temperature profile etc.) and with the regulating and control unit 11 the pressure in the chamber 1 is set in a regulated manner via the valve position to achieve the desired pressure. During passage through these production cycles, the valve positions in the individual cycles are stored over the regulating time. Then, desired regulating information combining the individual data sets (one data set per regulating cycle) is then derived from the amount of data which can thus be produced, e.g. by means of compensating calculation or modelling.

The checking functionality can further be configured to perform an adaptation of the target value to be reached depending on a recorded current regulating profile in order, for example to influence the regulating process in such a manner that an established deviation in the regulation is compensated in subsequent regulating cycles. In other words, the checking functionality can output the target value in particular in a time-dependent unchanged manner and introduce it into the control circuit in this form.

In a similar manner, the checking functionality can act accordingly on the currently measured control variable (e.g. measured pressure). For example, the presence of a higher pressure than actually measured can be simulated in order to bring about a more rapid decrease in the internal pressure.

An intervention in the regulating process by means of the checking functionality can be accomplished in particular by means of direct input into the regulator, e.g. by adapting regulating parameters.

The regulating and control unit 11 additionally has an output channel 16. With this a signal can be output which comprises information relating to the current regulating state. Thus, for example a user can identify whether the process is taking place within its predefined limits or deviations from this are present. Alternatively or additionally, the signal can be provided to a processing unit or superordinate process control whereby, for example, automatic adaptations of an entire process can be made.

By means of the checking functionality it can therefore be checked not only whether a regulating process provided for the valve 10 is adhered to but furthermore a prediction can be made as to whether the processing process itself is taking place within its defined boundary conditions. If, for example, a deviation is determined between a current recorded regulating curve and the desired regulating curve stored for the process, by means of this deviation it can be concluded for example that there is a leak in the process chamber or a feed to the process chamber and the process characterized accordingly as defective without an adaptation of the regulating cycle being made. Without the checking functionality according to the invention, such a leak could simply be "overregulated", i.e. the valve would be activated accordingly in such a manner that the desired pressure is reached in a predefined time without a defect in the process profile having been established externally.

FIGS. 2a and 2b each illustrate a regulating process at a vacuum valve for setting a new working point, i.e. a new pressure set point. It is thereby predefined to the system that an internal pressure of a vacuum chamber should be changed. This can be necessary, for example to execute a specific process step. Typically a target pressure to be reached is predefined as a desired value for such a step.

The respectively upper curve 121, 21 represents the pressure profile in the vacuum chamber over the time t. The second curve 122, 22 shown below the pressure curve 121, 21 represents the positioning or position of the valve closure over the period shown.

FIG. 2a shows a setting of the new pressure by means of an exclusive regulation of the closure position. Such a regulation is known in principle from the prior art.

Here the desired change in the pressure is prescribed at time $t_0$. In response to this specification, the position of the valve closure is varied. In the curve 122 this is illustrated by the level drop of the curve 122 immediately after $t_0$. As a result of this new position of the valve closure, the pressure in the chamber initially increases accordingly rapidly (curve 121 after $t_0$) and approaches the required pressure level. As shown a countermovement of the valve closure is initiated by means of the regulating so that the chamber internal pressure does not increase beyond the desired pressure.

In the time section shown $\Delta t_1$, the chamber pressure levels out at the desired level. This levelling out is the result of the regulated movement of the valve closure. If the pressure tends to increase, for example above the desired pressure, a "countermovement" is initiated by the valve, i.e. typically an increase in the exposed valve opening is set so that a negative pressure provided by a vacuum pump is increased. Depending on the manifestation of this regulating movement of the closure, an opposite movement again takes place subsequently in order to counteract any following tendency of the too-low internal pressure.

For direct comparison with a sequential regulation according to the invention, FIG. 2b illustrates such a sequential regulation with a controlled pre-regulating step (first sequence) and a subsequent regulating step (second sequence) to achieve the same desired pressure (as in FIG. 2a).

At the time $t_0$ therefore a regulated movement of the valve closure does not begin directly here but the closure is placed into a predefined valve position in the first step (curve 22). For this position preferably an associated effect on the internal pressure which can thereby be achieved (curve 21) is already known and linked. If the valve closure is therefore brought into this pre-regulating position, the internal pressure is accordingly rapidly and specifically approached to the pressure level which is ultimately to be achieved.

This position can be determined, for example by means of a learning process executed beforehand for the control. As a result of the frequently cyclically repeated process steps in a vacuum chamber, a described pressure change in the chamber can very frequently be passed through repeatedly during a specific production of a plurality of identical products. A teaching of the pre-regulating position is therefore particularly advantageous here.

An active regulation of the closure position is, for example, only started after the controlled adjustment of the closure into the pre-regulating position. An overlap of the controlled movement and the regulated movement of the valve closure is also possible. The regulation can therefore be initiated, for example shortly before reaching the closure position or the new desired pressure.

A subsequent regulating step can therefore be seen within the framework of the present invention not exclusively as a temporally completely separate step but is only initiated following the pre-regulating in time.

As can be clearly seen, the time $\Delta t_2$ which can be achieved with the present invention for setting the new pressure is significantly reduced compared with $\Delta t_1$. A regulation-based levelling-out process of the pressure around the desired pressure is reduced or largely avoided by the controlled approach to the pre-regulating position. This results in a more rapid attainment of the desired pressure in the total of the controlled pre-regulating step and the following classical regulating step.

Furthermore, the invention provides a continuous updating of the pre-regulating position. This is particularly advantageous in particular for the typically repeatedly executed regulating process in the course of, for example, a series production of a specific substrate. Here the pre-regulating position for each regulating cycle can be set using the data obtained from the preceding or several preceding cycles.

Preferably the pressure profile 21 of a current regulating cycle can be recorded and compared with the pressure profile of a preceding or with another reference profile. By means of this comparison a correction or adaptation of the set pre-regulating position can then be made. The adaptation is accomplished here in particular depending on a determined deviation between the two profiles, i.e. if the deviation exceeds a certain tolerance range, a resetting of the pre-regulating position can be made with a direction and with a magnitude in such a manner that a counter-effect to the deviation is thereby provided. In particular, an effect of a specific variation of the pre-regulating position on a pressure change which can be brought about thereby (e.g. at a specific regulating time point and per unit time) is known, i.e. can be predicted accordingly in particular for a known process system. With this knowledge, the updating of the pre-regulating position can be made very accurately and with optimized effect.

Figure 3B:
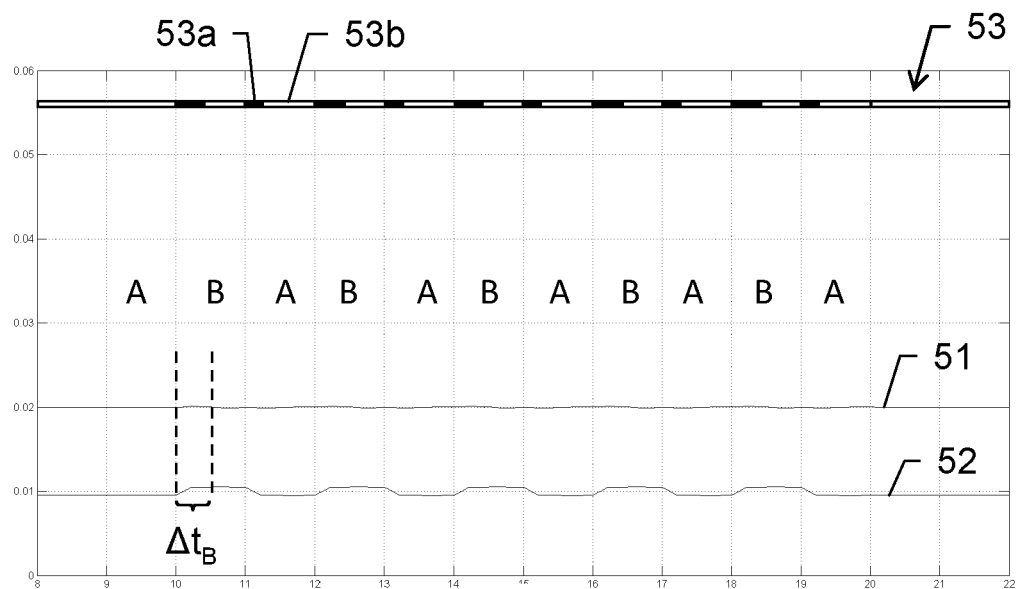

FIGS. 3a and 3b each illustrate a regulating process at a vacuum valve for regulating or maintaining a chamber pressure with variable flow, for example, of a process gas. It is thereby predefined to the system that an internal pressure of a vacuum chamber should be kept constant. This can be necessary, for example, for executing specific successive process steps in which different process gases are certainly used but the pressure in the chamber should be kept at the same level for processing.

FIGS. 3a and 3b show the sequence of a processing in the vacuum chamber over several process cycles. In the variant shown, two different processings, e.g. coating processes, are carried out alternately. This is illustrated by the sequence of the two sequences A and B. Each process step extends over a time unit, wherein the sequences A each take place with the same process parameters and the sequences B also take place with the same process parameters, in particular different from A (e.g. inflow of a different process gas).

FIG. 3a shows the pressure profile 151 and the position profile 152 in the case of a classical exclusive regulation of the chamber pressure by means of the regulated setting of the position of the valve closure.

In the profile of the chamber internal pressure, a switchover between the respective sequences A and B can be clearly identified. Almost immediately after the switchover process, i.e. a change of the gas flow in the chamber, the curve 151 shows respective deflections. On transition from process cycle A into cycle B, the pressure increases relatively rapidly since for example more process gas is fed into the chamber per unit time.

As a direct response to the measured pressure rise, the position of the valve closure is changed in a regulated manner. On transition from A to B, an increase in the flow opening on the vacuum valve takes place for this purpose, i.e. a position change of the valve closure manifest in the positive direction. This can be derived by means of the position curve 152. The pressure then drops again and falls below the desired pressure for a short time interval. Again in response to the severe drop, the position of the closure is readjusted so that for the process cycle B the original chamber pressure (desired pressure) is held with changed valve opening.

On transition from process cycle B to cycle A, the pressure decreases relatively rapidly and the valve position is regulated in the opposite direction (reduction of the valve flow opening) in principle similarly to that on transition from A to B.

The regulating steps are repeated accordingly frequently over the entire process duration (here: eleven process cycles).

During these transitions, the time before reaching the desired pressure is relatively long. A large proportion of the respective regulating cycles is taken up here by the levelling out process $\Delta t_A$ and $\Delta t_B$. The desired pressure is substantially constant only in a comparatively small part of the cycle.

FIG. 3b on the other hand shows the profile of the pressure 51 and the valve position 52 during repeated execution of a regulating cycle according to the invention with a controlled pre-regulating and a following regulating step. The frame parameters for the process cycles A and B are similar to those of process A and B in FIG. 3a.

The increased uniformity of the pressure profile 51 achieved here over the entire process can be clearly identified. During the respective transitions from one regulating cycle to the following regulating cycle, a sharp increase or decrease in the desired pressure in the chamber is largely reduced or avoided. This improvement is crucially achieved by the preceding pre-regulating step.

If for example a transition is made from one regulating cycle B to a cycle A, a regulating and control unit configured according to the invention receives a corresponding trigger signal, e.g. from a process controller. The trigger signal or its generation depends in particular on the starting point for the cycle A. With the trigger cycle the respective regulating cycle is started. In particular, the trigger signal is synchronized with a gas inflow system so that the regulating cycle can take place matched, e.g. to the supply of an additional process gas or a larger quantity of gas per time.

Alternatively it is also feasible that the regulating and control unit directly receive a signal from a gas flow meter or regulator and based on this signal, the corresponding regulation of the valve position is initiated.

In one embodiment the data for executing a regulating cycle can be stored, e.g. in the regulating and control unit or in a memory in communication with this unit. The data typically comprise the pre-regulating position to be approached in a controlled manner and parameters for the transition from the pre-regulating step into the regulating step (e.g. time point).

As a result of the pre-regulating step which takes place first, the closure position is here therefore already moved into a state in which the desired pressure to be set is already at least approached or achieved approximately. The desired pressure is then set precisely and held by the executed regulating step.

The time until the required desired pressure is achieved again and held in the chamber during a flow variation is significantly shorted with the method according to the invention, i.e. the desired pressure is leveled out more rapidly (cf. with FIG. 3a). This results in a corresponding saving in time and therefore overall a shortened and more efficient process step. This is shown for example with the time $\Delta t_B$ required for setting of the desired pressure in the cycle B. On transition from cycle B to A, the pre-control is already so exact and suitable that barely any deviations in the desired pressure occur and the desired pressure is maintained substantially unchanged.

The depicted bar 53 shows the time distribution of pre-control phases 53a in which the valve closures are placed into the pre-regulating position and the actual "true" regulating phases 53b during the regulating cycles. The time extension of the pre-control phases 53a differs in cycles A and B.

According to the invention, an updating for the respective regulating cycles runs over the entire process duration, i.e. during execution of the eleven depicted cycles. For the two cycles A and B an updating function is provided here, i.e. an updating function for cycle A and an updating function for cycle B. As an example, the updating function is described in the following for cycle B.

During the first execution of cycle B, the valve closure is brought into a predefined position in the pre-regulating step. This pre-regulating position can for example be determined by means of a preceding learning process or adapted manually. The pre-regulating step is followed by the continuously regulated setting of the closure position. For this cycle B the regulating profile, i.e. the pressure profile curve 51 and/or the position profile curve 52 is recorded. Using the regulating profile thus indicated, a comparison can be made with a desired regulating profile for cycle B, in particular with a desired regulation, and based on this comparison any deviation from the desired regulating profile can be determined. Depending on the derived deviation, an adaptation of the pre-regulating position can be made for the next execution or the next executions of cycle B. The adaptation is made in particular subject to a deviation greater than a permissible tolerance.

The adaptation of the pre-regulating position can be made such that when determining a deviation in such a manner that a pressure rise after the beginning of cycle B is more strongly defined than as originally provided, a new pre-regulating position is determined and stored which provides an enlarged open position of the valve on entry into cycle B. As a result, the excessive pressure rise can be accordingly counteracted. In addition, not only the pre-regulating position can be adapted in its direction but also the magnitude of the variation can be updated by means of a determined extent of the deviation.

During the second execution of cycle B, i.e. after an intermediate cycle A, the valve closure is moved into the thus newly defined pre-regulating position in the pre-regulating step which takes place in a controlled manner. The regulating step takes place accordingly. The regulating profile is again recorded for this second execution. This profile can now optionally again be compared with the originally predefined reference regulation or with the profile of the preceding cycle B. In other words, the desired regulating profile is represented by the predefined reference regulation or by the profile of the preceding cycle B.

If it is determined, for example by a comparison of regulating profiles that despite an excessive pressure rise, the time before levelling out to the desired pressure decreases, an updating of the pre-regulating position can also specifically intend an initially increased deviation (e.g. more defined pressure fluctuations) from a reference regulation. By accepting temporarily larger regulating deviations, shorter process times can thus be achieved.

In addition, a positive effect on the regulating cycle B can be derived as a result of the preceding variation of the pre-regulating and thus a predictability of an effect brought about by the pre-regulating position can be determined.

Figure 4A:
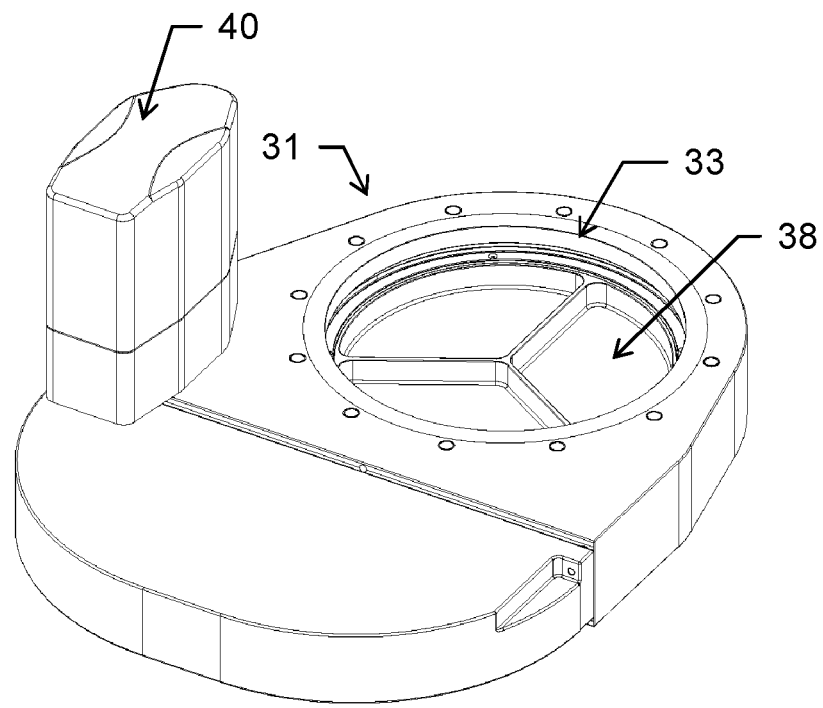
FIG. 4a-c show an embodiment of a regulatable vacuum valve according to the invention as a pendulum valve.
Figure 4B:
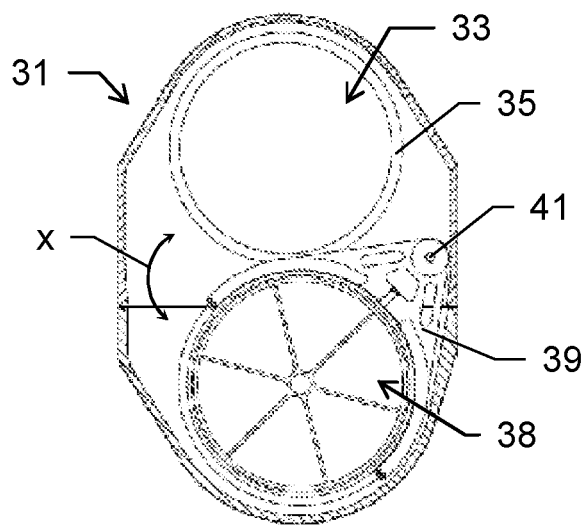
Figure 4C:
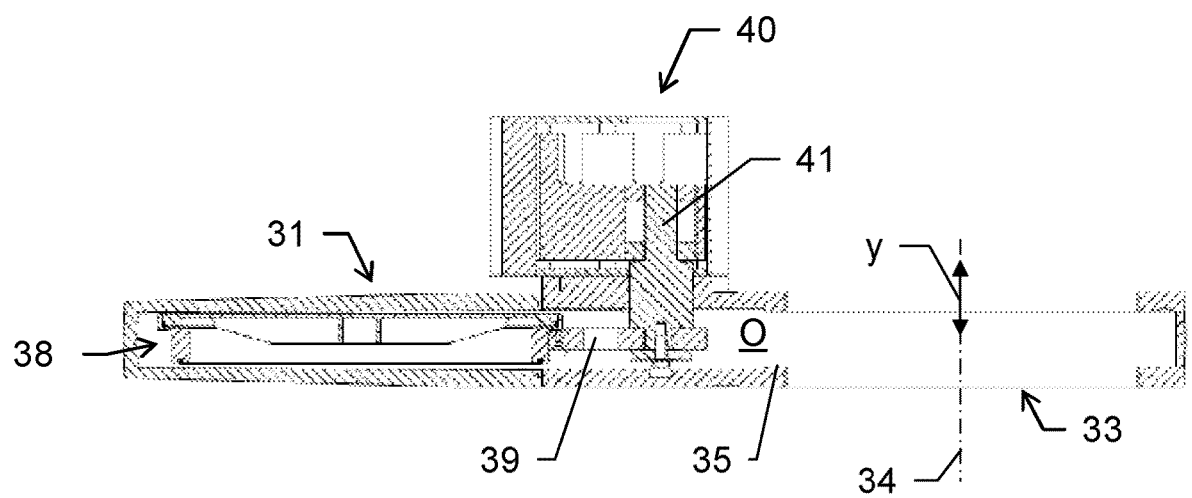

FIGS. 4a to 4c show a possible embodiment of the valve according to the invention in the form of a pendulum valve. The valve for substantially gastight interruption of a flow path possesses a valve housing 31 which has an opening 33. The opening has a circular cross-section. In a closed position of the valve disk 38 (valve closure), the opening 33 is closed in a gastight manner by means of the valve disk 38. An open position O of the valve disk 38 is illustrated in FIGS. 4b and 4c.

The opening 33 is enclosed by a valve seat. This valve seat is formed by a sealing surface 35 which points axially in the direction of the valve disk 38 and runs transversely to the opening axis 34 and which has the shape of a circular ring, which is formed in the valve housing 31.

In addition, the valve possesses a pivotable valve disk 38 which is also adjustable substantially parallel to the opening axis 34.

The valve disk 38 is connected to an electrical drive 40 (motor) via an arm disposed laterally on the disk and extending perpendicularly to the opening axis 34. This arm 39 is located in the closed position of the valve disk 38 outside the opening cross-section of the opening 33 projected geometrically along the opening axis 34.

An electrical drive 40 is configured by using a corresponding transmission in such a manner that the valve disk 38—as is usual with a pendulum valve—is pivotable by means of a transverse movement x of the drive 40 transversely to the opening axis 34 and substantially parallel over the cross-section of the opening 33 and perpendicular to the opening axis 34 in the form of a pivoting movement about a pivot axis 41 between an open position O and an intermediate position and linearly displaceable by means of a longitudinal movement y of the drive 40 parallel to the opening axis 34. In the open position, the valve disk 38 is positioned in a dwell section disposed laterally adjacent to the first opening 33 so that the opening 33 and the flow path are released. In the intermediate position the valve disk 38 is positioned at a distance above the first opening 33 and covers the opening cross-section of the opening 33. In the closed position, the opening 33 is closed in a gastight manner and the flow path interrupted whereby a gastight contact exists between the valve closure 38 (valve disk) and the sealing surface 35 of the valve seat.

In order to enable an automated and regulated opening and closing of the valve, the valve provides an electronic regulating and control unit which is configured in such a manner and is in communication with the drive 40 such that the valve disk 38 is adjustable accordingly for the gastight closure of a process volume or for regulating an internal pressure of this volume. Such a regulating unit together with the valve forms a valve system according to the invention.

As described above, the valve disk 38 is initially moved into a defined pre-regulating position in a controlled manner. The position of the valve disk 38 is then set variably by means of the control variables and an output control variable. Information relating to a current pressure state in a process volume connected to the valve is obtained as input signal. In addition, another input quantity, e.g. a mass flow into the volume, can be provided to the regulator. By means of these quantities and by means of a predefined desired pressure which should be set or achieved for the volume, a regulated setting of the valve then takes place over the time of a regulating cycle so that a mass flow from the volume can be regulated over time by means of the valve. For this purpose a vacuum pump is provided downstream of the valve, i.e. the valve is arranged between the process chamber and the pump. Thus, a desired pressure profile can be leveled out.

By setting the valve closure 38, a respective opening cross-section is set for the valve opening 33 and thus the possible quantity of gas which can be evacuated per unit time from the process volume is set. For this purpose the valve closure 38 can have a shape which differs from circular, in particular to achieve a medium flow which is as laminar as possible.

For setting the opening cross-section the valve disk 38 can be adjusted by the regulating and control unit 11 by means of the transverse movement x of the drive 40 from the open position O into the intermediate position and by means of the longitudinal movement y of the drive 40 from the intermediate position into the closed position. For complete opening of the flow path the valve disk 38 can be adjusted by the control by means of the longitudinal movement y of the drive 40 from the closed position into the intermediate position and from there by means of the transverse movement x of the drive 40 from the intermediate position into the open position O.

In the present exemplary embodiment the drive 40 is configured as an electric motor wherein the transmission can be switched in such a manner that a driving of the drive 40 either brings about the transverse movement x or the longitudinal movement y. The drive 40 and the transmission are activated electronically by the regulation. Such transmissions, in particular with gate shifting, are known from the prior art. It is further possible to use several drives to bring about the transverse movement x and the longitudinal movement y, wherein the control takes over the activation of the drives.

The precise regulation or setting of the flow using the described pendulum valve is not only possible through the pivoting adjustment of the valve disk 38 between the open position O and the intermediate position by means of the transverse movement x but primarily by linear adjustment of the valve disk 38 along the opening axis 34 between the intermediate position, the closed position by means of the longitudinal movement y. The described pendulum valve can be used for precise regulating tasks.

Both the valve disk 38 and also the valve seat each have a sealing surface 35—a first and a second sealing surface. The first sealing surface 35 additionally has a seal. This seal can be vulcanized for example as a polymer by means of vulcanization onto the valve seat. Alternatively the seal can for example be designed as an O ring in a groove of the valve seat. A sealing material can also be glued onto the valve seat and thereby embody the seal. In an alternative embodiment the seal can be arranged on the side of the valve disk 38, in particular on the second sealing surface. Combinations of these designs are also feasible.

Alternatively to a pendulum valve as shown, the vacuum valve system according to the invention can be implemented with a different type of vacuum valve, e.g. a flap valve, slide valve or a so-called butterfly regulating valve. In particular, the system with pressure regulating valves is configured for use in the vacuum area. Furthermore, pendulum valves can also be used, whose closure can only be adjusted in one direction.

It is understood that the depicted figures only schematically depict possible exemplary embodiments. The various approaches can according to the invention also be combined with one another and with prior art methods and devices for pressure regulation for vacuum processes.

The invention claimed is:

1. A valve system comprising a vacuum valve for regulating a volume or mass flow and/or for gas-tight sealing off a process volume and a regulating and control unit, wherein the vacuum valve comprises a valve seat which has a valve opening defining an opening axis and a first sealing surface running around the valve opening, a valve closure for substantially gas-tight closure of the valve opening having a second sealing surface corresponding to the first sealing surface and a drive unit coupled to the valve closure which is configured in such a manner that the valve closure
      is variable and adjustable in a defined manner to provide respective closure positions and
      can be adjusted from an open position in which the valve closure at least partially releases the valve opening into a closed position in which the first sealing surface is pressed onto the second sealing surface and closes the valve opening in a substantially gas-tight manner and back wherein the control and regulating unit is configured for in particular multiple execution of a regulating cycle with a pre-regulating step and a subsequent regulating step for the valve closure, wherein when executing the regulating cycle in the course of the pre-regulating step the valve closure is moved by corresponding activation of the drive unit, in particular from the open position into a defined actual pre-regulating position controlled by the regulating and control unit and in the course of the regulating a specific variation or adjustment of the closure position is executed depending on the actual pre-regulating position by activating the drive unit based on an actually determined control variable for a process parameter and on a target value, in particular whereby the control variable can be brought close to the target value, wherein an effect caused by a defined position change of the valve closure on the control variable can be predicted at least partially and wherein the regulating and control unit has an updating functionality which is configured in such a manner that during its execution the control variable is recorded at least during a part of the regulating cycle and based thereon an actual regulating profile is derived, the actual regulating profile is compared with a reference regulating profile and a regulating deviation is derived, an adaptation of the actual pre-regulating position is made depending on a manifestation of the derived regulating deviation and based on the at least partially predictable effect on the control variable and the adapted pre-regulating position is provided and/or stored as the actual pre-regulating position for the regulating cycle, wherein the regulating and control unit is configured in such a manner that the updating functionality can be executed continuously, in particular over a plurality of regulating cycles during a production process with the process volume.

2. The valve system according to claim 1, wherein the updating functionality is configured in such a manner that the reference regulating profile is produced and stored by recording the control variable during execution of a first regulating cycle or a first regulating step and the actual regulating profile is derived by recording the control variable during execution of a second regulating cycle or a second regulating step, in particular wherein the second regulating cycle or the second regulating step is executed following the first regulating cycle or the first regulating step.

3. The valve system according to claim 1 wherein the regulating and control unit is configured in such a manner that the reference regulating profile is produced and stored by recording the control variable during execution of a plurality of regulating cycles or a plurality of regulating steps, in particular wherein an averaging of the control variables recorded for a specific time interval or for a specific time point of the regulating step is accomplished.

4. The valve system according to claim 1, wherein the regulating and control unit has a learning functionality for generating the reference regulating profile, wherein the learning functionality is configured in such a manner that during its execution for carrying out a number of substantially identical regulating cycles corresponding to a desired operation for the regulating cycle, respective desired positions for the valve closure are recorded over at least one time section of a respective regulating cycle and the recorded desired positions for the valve closure are stored with reference to the respective time sections of the regulating cycle as the reference regulating profile.

5. The valve system according to claim 1, wherein the regulating and control unit is configured in such a manner that the actual pre-regulating position is adapted in such a manner that an effect on the control variable which counteracts in a defined manner the regulating deviation in terms of direction and/or in terms of magnitude is produced with the adapted pre-regulating position.

6. The valve system according to claim 1, wherein the pre-regulating step is initiated or executed depending on a receipt of a starting signal.

7. The valve system according to claim 6, wherein the start signal is generated by a superordinate process controller, wherein the process controller is configured to control a production process with the process volume for a multiplicity of products of the same type, the regulating cycle represents a part of the production process which accordingly recurs multiple times and the start signal is accordingly output multiple times in the course of the production process.

8. The valve system according to claim 1, wherein the actual regulating profile and/or the reference regulating profile is recorded in the form of a regulating curve and/or the reference regulating profile is defined depending on the target value and a permissible time duration for the regulating cycle or for the pre-regulating step or the regulating step.

9. The valve system according to claim 1, wherein the process parameter is embodied by pressure information for the process volume the target value is a desired pressure to be reached in the process volume and the actually determined control variable represents an actual pressure in the process volume.

10. The valve system according to claim 1, wherein the target value is a desired pressure to be reached in the process volume and the actually determined control variable specifies an actual medium inflow into the process volume, in particular wherein the actually determined control variable takes into account a actual pressure inlet size.

11. The valve system according to claim 1, wherein outlet information is stored or actually determined with the actually determined control variable, wherein the outlet information specifies which mass or which volume of a medium flows out from the process volume per unit time and depending on the closure position.

12. The valve system according to claim 1, wherein the regulating and control unit is connected to a pressure sensor and the output signal of the pressure sensor provides the actually determined control variable and/or to a mass flow meter or a mass flow monitoring unit and an output signal of the mass flow meter or the mass flow monitoring unit provides the actually determined control variable.

13. A regulating and control unit for a vacuum valve, wherein the vacuum valve is configured for regulating a volume or mass flow and/or for gas-tight sealing off a process volume and has an adjustable valve closure, wherein the regulating and control unit is configured for, in particular multiple, execution of a regulating cycle with a pre-regulating step and a following regulating step for the valve closure, wherein when executing the regulating cycle
- in the course of the pre-regulating step the valve closure is moved by corresponding activation of a drive unit, in particular from an open position into a defined actual pre-regulating position controlled by the regulating and control unit and
- in the course of the regulating step a specific variation or adjustment of the closure position is executed depending on the actual pre-regulating position by activating the drive unit based on an actually determined control variable for a process parameter and on a target value, in particular whereby the control variable can be brought close to the target value, wherein an effect caused by a defined position change of the valve closure on the control variable can be predicted at least partially and wherein the regulating and control unit has an updating functionality which is configured in such a manner that during its execution
- the control variable is recorded at least during a part of the regulating cycle and based thereon an actual regulating profile is derived,
- the actual regulating profile is compared with a reference regulating profile and a regulating deviation is derived,
- an adaptation of the actual pre-regulating position is made depending on a manifestation of the derived regulating deviation and based on the at least partially predictable effect on the control variable and
- the adapted pre-regulating position is provided and/or stored as the actual pre-regulating position for the regulating cycle, wherein the regulating and control unit is configured in such a manner that the updating functionality can be executed continuously, in particular over a plurality of regulating cycles during a production process with the process volume.

14. Method for carrying out a production cycle with a vacuum valve, wherein the vacuum valve is configured for regulating a volume or mass flow and/or for gas-tight sealing off a process volume and comprises
- a valve seat which has a valve opening defining an opening axis and a first sealing surface running around the valve opening,
- a valve closure for substantially gas-tight closure of the valve opening having a second sealing surface corresponding to the first sealing surface and
- a drive unit coupled to the valve closure which is configured in such a manner that the valve closure
  - is variable and adjustable in a defined manner to provide respective closure positions and
  - can be adjusted from an open position in which the valve closure at least partially releases the valve opening into a closed position in which the first sealing surface is pressed onto the second sealing surface and closes the valve opening in a substantially gas-tight manner and back wherein in the course of the method
- a regulating cycle for the valve closure is executed, in particular multiple times and the regulating cycle at least comprises
  - a controlled movement of the valve closure depending upon receipt of a start signal by targeted activation of the drive unit, in particular from the open position into a defined actual pre-regulating position and subsequently
  - a regulated variation or adjustment of the closure position depending on the actual pre-regulating position by activating the drive unit based on an actually determined control variable for a process parameter and a target value, in particular whereby the control variable is brought close to the target value, wherein an effect caused by a defined position change of the valve closure on the control variable can be predicted at least partially,
- the control variable is recorded at least during a part of the regulating cycle and based thereon an actual regulating profile is derived,
- the actual regulating profile is compared with a reference regulating profile and a regulating deviation is derived,
- an adaptation of the actual pre-regulating position is made depending on a manifestation of the derived regulating deviation and based on the at least partially predictable effect on the control variable and
- the adapted pre-regulating position is provided and/or stored as the actual pre-regulating position for the regulating cycle.

15. Computer program product which is stored on a machine-readable carrier, in particular in a storage unit of a valve system according to claim 1 or a regulating and control unit according to claim 13, with program code for executing or controlling at least the following steps of the method according to claim 14
- a controlled movement of the valve closure,
- a regulated variation or adjustment of the closure position,
- a derivation of an actual regulating profile and comparison with a reference regulating profile,
- a derivation of a regulating deviation,
- an adaptation of the pre-regulating position depending on a manifestation of the derived regulating deviation and based on the at least partially predictable effect on the control variable and
- a provision of the adapted pre-regulating position as the actual pre-regulating position for the regulating cycle, in particular wherein the program is executed in an electronic data processing unit, in particular the regulating and control unit of a valve system according to claim 1, or a regulating and control unit according to claim 13.

* * * * *